(12) United States Patent
Glasson (10) Patent No.: US 6,702,600 B2
(45) Date of Patent: Mar. 9, 2004

(54) HIGH PRESSURE SEAL ASSEMBLY FOR A HYDRAULIC CYLINDER

(75) Inventor: Richard O. Glasson, Whippany, NJ (US)

(73) Assignee: Control Products Inc., East Hanover, NJ (US)

( * ) Notice: Subject to any disclaimer, the term of this patent is extended or adjusted under 35 U.S.C. 154(b) by 0 days.

(21) Appl. No.: 10/268,527

(22) Filed: Oct. 10, 2002

(65) Prior Publication Data

US 2003/0029310 A1 Feb. 13, 2003

Related U.S. Application Data

(60) Division of application No. 09/793,218, filed on Feb. 26, 2001, which is a continuation-in-part of application No. 09/302,701, filed on Apr. 30, 1999, now Pat. No. 6,234,061.
(60) Provisional application No. 60/104,866, filed on Oct. 20, 1998.

(51) Int. Cl.$^7$ ............................................. F01B 25/26
(52) U.S. Cl. ........................................ 439/190; 92/5 R
(58) Field of Search ................. 92/5 R; 91/1; 439/190, 439/198, 199

(56) References Cited

U.S. PATENT DOCUMENTS

| 4,480,151 | A |   | 10/1984 | Dozier |
| 5,046,243 | A |   | 9/1991  | Walker |
| 5,203,723 | A |   | 4/1993  | Ritter |
| 5,917,164 | A | * | 6/1999  | Sasaki ...................... 200/83 P |
| 6,413,179 | B1 | * | 7/2002 | Koike ......................... 474/109 |
| 6,450,048 | B1 | * | 9/2002 | Samuelson et al. ........ 73/866.5 |
| 6,588,313 | B2 | * | 7/2003 | Brown et al. ................. 92/5 R |

FOREIGN PATENT DOCUMENTS

FR          2794236        12/2000

OTHER PUBLICATIONS

Applied Technologies Group, "Branson Part Design for Ultrasonic Welding", 1975.
Applied Technologies Group, "Branson Ultrasonic Staking", 1980.

* cited by examiner

Primary Examiner—Gary Paumen
(74) Attorney, Agent, or Firm—Gibbons, Del Deo, Dolan, Griffinger & Vecchione (57) ABSTRACT

A high pressure seal assembly provides an electrical path between the sensor and an external connector.

12 Claims, 8 Drawing Sheets

HIGH PRESSURE SEAL ASSEMBLY FOR A HYDRAULIC CYLINDER

RELATED APPLICATIONS

This application is a divisional of application Ser. No. 09/793,218, filed Feb. 26, 2001, entitled "PRECISION SENSOR FOR A HYDRAULIC CYLINDER" which is a continuation-in-part of and claims the benefit of U.S. application Ser. No. 09/302,701, filed on Apr. 30, 1999, now U.S. Pat. No. 6,234,061 entitled "PRECISION SENSOR FOR A HYDRAULIC CYLINDER" which, in turn, claims the benefit of U.S. Provisional Application No. 60/104,866 filed on Oct. 20, 1998.

FIELD OF THE INVENTION

The invention generally relates to hydraulic cylinders, and more particularly, to high pressure seal assemblies for use on cylinders.

BACKGROUND

Equipment implementing hydraulic cylinders for mechanical movement, such as excavators and other heavy construction equipment, depend upon operators to manually move control levers to open and close hydraulic valves that direct pressurized fluid to hydraulic cylinders. For example, when the operator lifts a lift arm, the operator actually moves a lever associated with the lift arm causing a valve to release pressurized fluid to the lift arm cylinder. The use of levers to control hydraulic equipment depends upon manual dexterity and requires great skill. Improperly operated equipment poses a safety hazard and faulty operation of excavators, bucket loaders or like equipment may cause damage of overhead utility wires, underground wiring, water mains, and underground gas lines.

The operation of such hydraulic cylinders depends upon a position sensor such as a rotary potentiometer or other type of sensor such as those relying upon optical, conductive plastic or metal-in-glass technologies. It is a disadvantage of these sensors that they mount to the outside of the machinery, thereby exposing them to the environment. In the case of heavy equipment, this environment includes severe temperatures, excessive moisture, and air-borne particulate mater which may infect the sensor. In the case of optical, conductive plastic and metal-in-glass technologies, the sensors would rapidly degrade if used on construction equipment. Furthermore, some of these sensors use contacting components that are susceptible to wear, vibration and temperature. Thus, there is a demand for a low cost, long-life sensor operable in a harsh environment.

SUMMARY OF THE INVENTION

A sensor according to the present invention provides a precision signal utilizing a robust transducer. In one embodiment, the sensor mounts inside a hydraulic cylinder, away from the harsh environment, and provides a voltage or current signal indicative of the position of the piston. The sensor provides a connector, attached between a cylinder piston and a converting element, for sensing the displacement of the piston. The converting element converts the cylinder displacement to a proportional displacement of a translating member. A precision transducer senses the displacement of the translating member and provides an electrical output signal proportional to the piston movement or to the piston's position.

The electrical conductors can be passed through the wall of the hydraulic cylinder via a high pressure seal assembly that provides an electrical path for the sensor located within the high pressure environment of the cylinder to an external connector that is in the ambient environment where some external electronic equipment recognizes the various signals from the sensor and interprets those signals to determine the position of the piston.

BRIEF DESCRIPTION OF THE DRAWINGS

A more complete understanding of the invention may be obtained from consideration of the following description in conjunction with the drawings in which.

DETAILED DESCRIPTION

Figure 1:
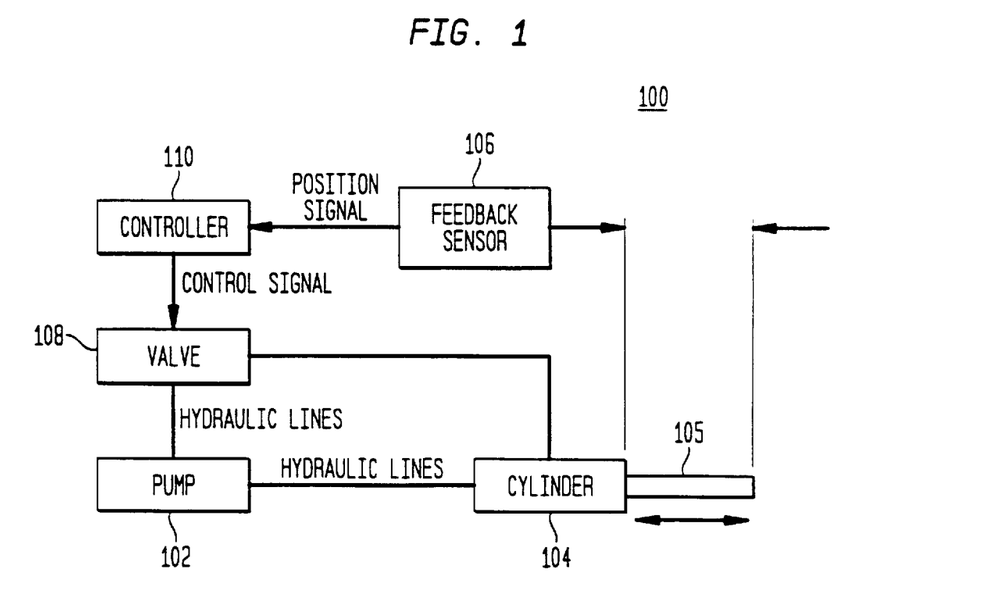
FIG. 1 is a block diagram of an exemplary feedback control system for a hydraulic cylinder.

In FIG. 1, a block diagram of an exemplary feedback control system 100 is shown. The control system 100 comprises a hydraulic cylinder 104 actuated by a pump 102 and a valve 108. As is known in the art, the pump 102 delivers hydraulic fluid under pressure to the cylinder 104 which forces the piston 105 to move with respect to the cylinder. The valve 108 controls the flow of hydraulic fluid to the cylinder 104. To implement feedback control, a feedback sensor 106 senses the position of the piston 105 and delivers a position signal to a controller 110. The controller 110 actuates the valve 108 according to certain instructions. The piston 105 may be attached to some other apparatus (not shown) whereby a displacement of the piston causes a displacement of the apparatus. Although a hydraulic cylinder is shown, it should be apparent that other types of cylinders, such as pneumatic cylinders, can be used.

Figure 2:
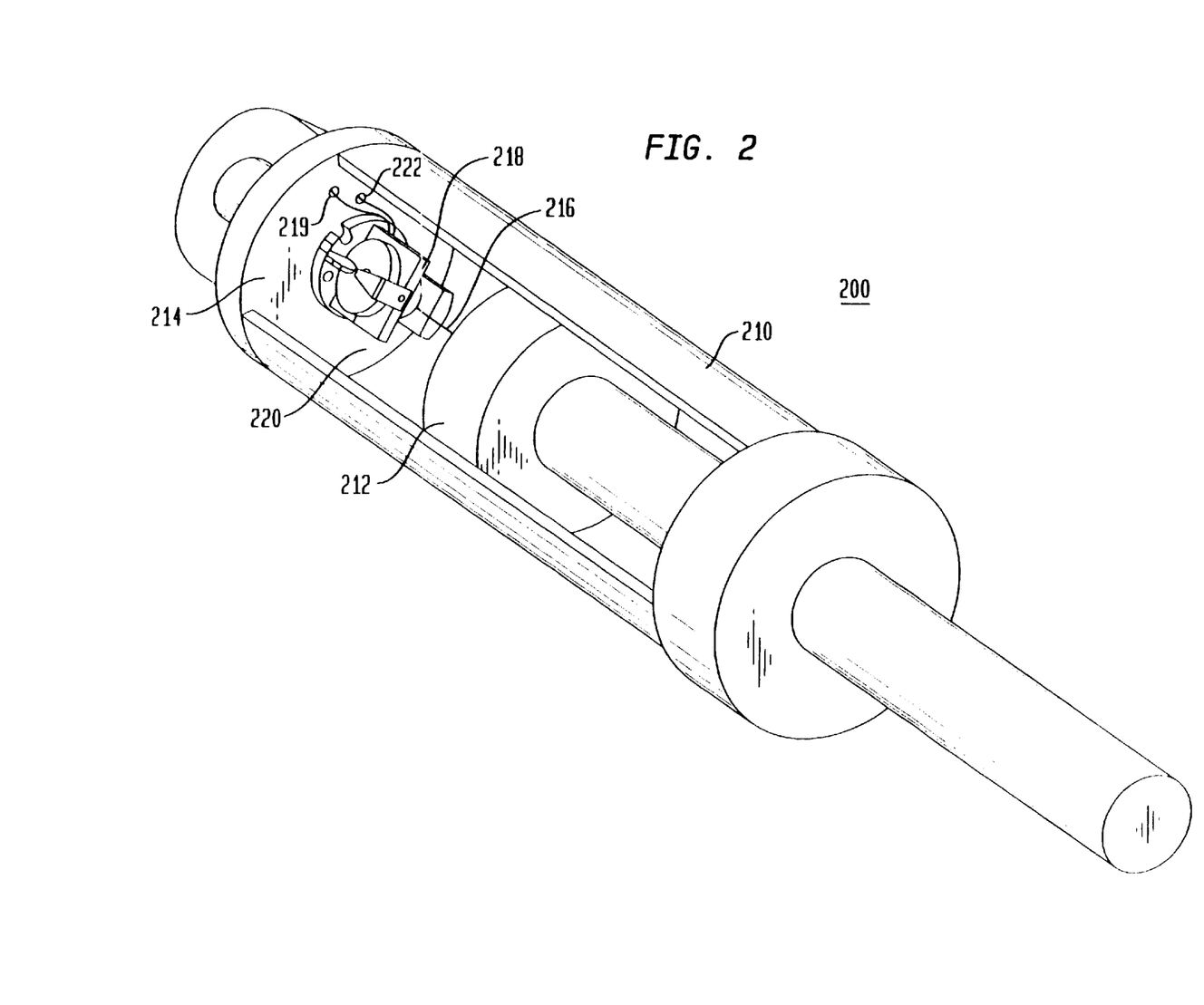
FIG. 2 shows a perspective of an exemplary cylinder according to the principles of the invention.

Referring to FIG. 2, a hydraulic cylinder 200 that can be used in the feedback control system of 100 of FIG. 1 is shown. The hydraulic cylinder 200 comprises a cylinder enclosure 210 and a piston 212. The piston 212 is operable to translate in dependence upon hydraulic fluid pumped into the cylinder. The cylinder enclosure 210 further includes a base 214, and the piston 212 is a moveable element with respect to the base. A precision sensor 218 provides a position-related signal across the terminals 219 and 222. For instance, the sensor delivers a signal across the sensor's terminals indicative of the position "d" in FIG. 2. A high pressure bulkhead connector (not shown) provides a mechanism for routing the terminals 219 and 222 to the outside of the cylinder enclosure 210. The sensor 218 further comprises a flexible connector 216 attached to the piston 212, a converting element 220 attached to the base 214 and a transducer (not shown). The connector 216 also attaches to the converting element 220 and directly imparts the displacement of the piston 220 with respect to the base 214 to the converting element 220. The converting element 220 converts this displacement to a proportional displacement of a translating member (not shown). The transducer, located remote from the piston, senses the position or motion of the translating member.

Figure 3:
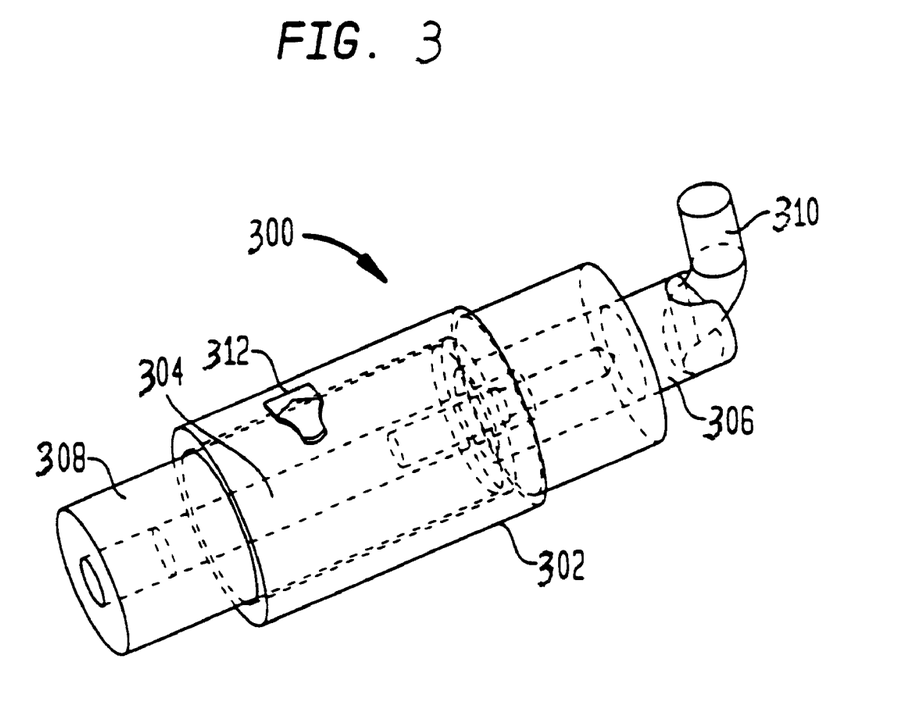
FIG. 3 shows an exemplary component according to the principles of the invention.

Turning now to FIG. 3, there is shown a perspective view, partly in section, showing an exemplary embodiment of some of the components used in constructing the converting element 300. In FIG. 3, there is a rotating hub 302 that basically rotates as the connector (not shown) is unwound and wound as determined by the position and movement of the piston (not shown). As the connector is extended and retracted proportionally with the piston movement, the rotating hub 302 thus rotates and is threadedly engaged to the LVDT core 304 affixed to a translating lead 306. By means of that threaded engagement, therefore, as the rotating hub 302 rotates, the LVDT core 304 moves along a linear path within the fixed LVDT body 308 to carry out the sensing of the rotation of the rotating hub 302 and, correspondingly, as explained, determines the position and movement of the piston. An anti-rotation tab 310 is provided to prevent the rotation of the LVDT core 304 so that the translation of the LVDT core 304 is solely along a linear path and not a rotational path. As may also be seen in FIG. 3, there is a notch 312 provided in order to attach the recoil spring, again, not shown in FIG. 3.

Figure 4A:
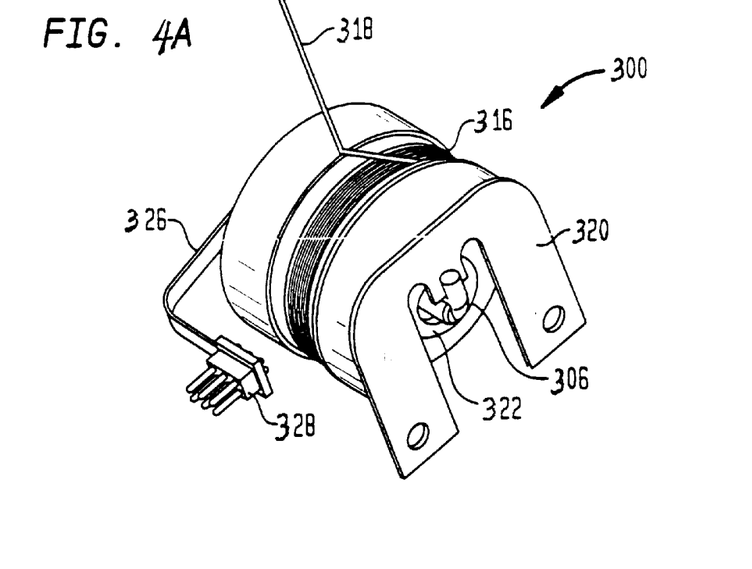
FIGS. 4A and 4B show an exemplary embodiment of certain components according to the principles of the invention.
Figure 4B:
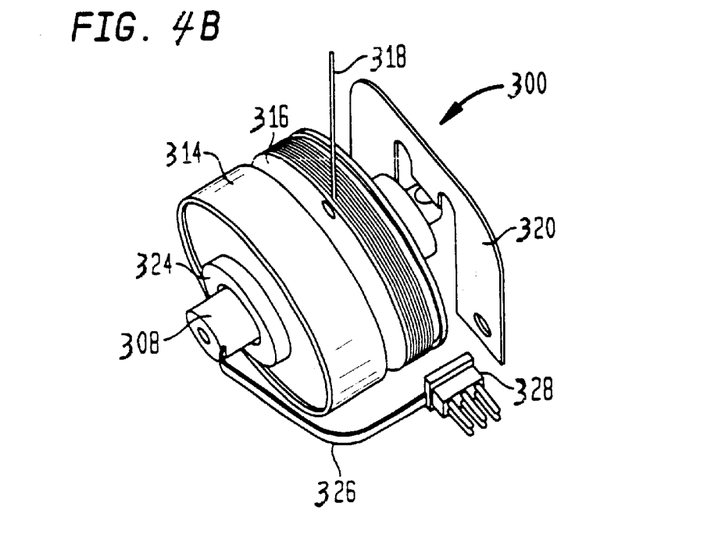

Turning now to FIGS. 4A and 4B, taken along with FIG. 3, there are shown perspective views, taken at different angles, showing the basic components of the translating element 300 of the present invention. Thus, there is a recoil spring casing 314 that surrounds the coil spring and the spool 316 on which is coiled the connector 318. The spool 316 is rotated as the connector 318 winds and unwinds in accordance with the movement of the piston (not shown) and that rotational movement of the spool 316 is converted to a translational linear movement of the LVDT core 304 which is sensed with respect to the fixed position of the LVDT body 308 to provide a recognizable signal that can be interpreted to indicate a positional parameter of the piston. The rotational movement is therefore converted to the linear translational movement of the LVDT core 304 by means of the threaded engagement described with respect to FIG. 3.

A set of electrical wires 326 extend from the LVDT body 308 and terminate in a LVDT male connector plug 328. The electrical wires 326 transmit the signals indicative of a particular positional parameter of the piston to external electronic equipment that can interpret and use those signals to carry out the intent and purpose of the present invention. It should also be noted, at this point, that the components described with respect to FIGS. 3, 4A and 4B are all located within the hydraulic cylinder and thus are submersed in the high pressure hydraulic fluid, including the electrical wires 326 and the LVDT male connector plug 328 and it is therefore necessary to transmit the signals from the LVDT body 308 to the exterior of the hydraulic cylinder in order to make effective use of those signals.

Figure 5:
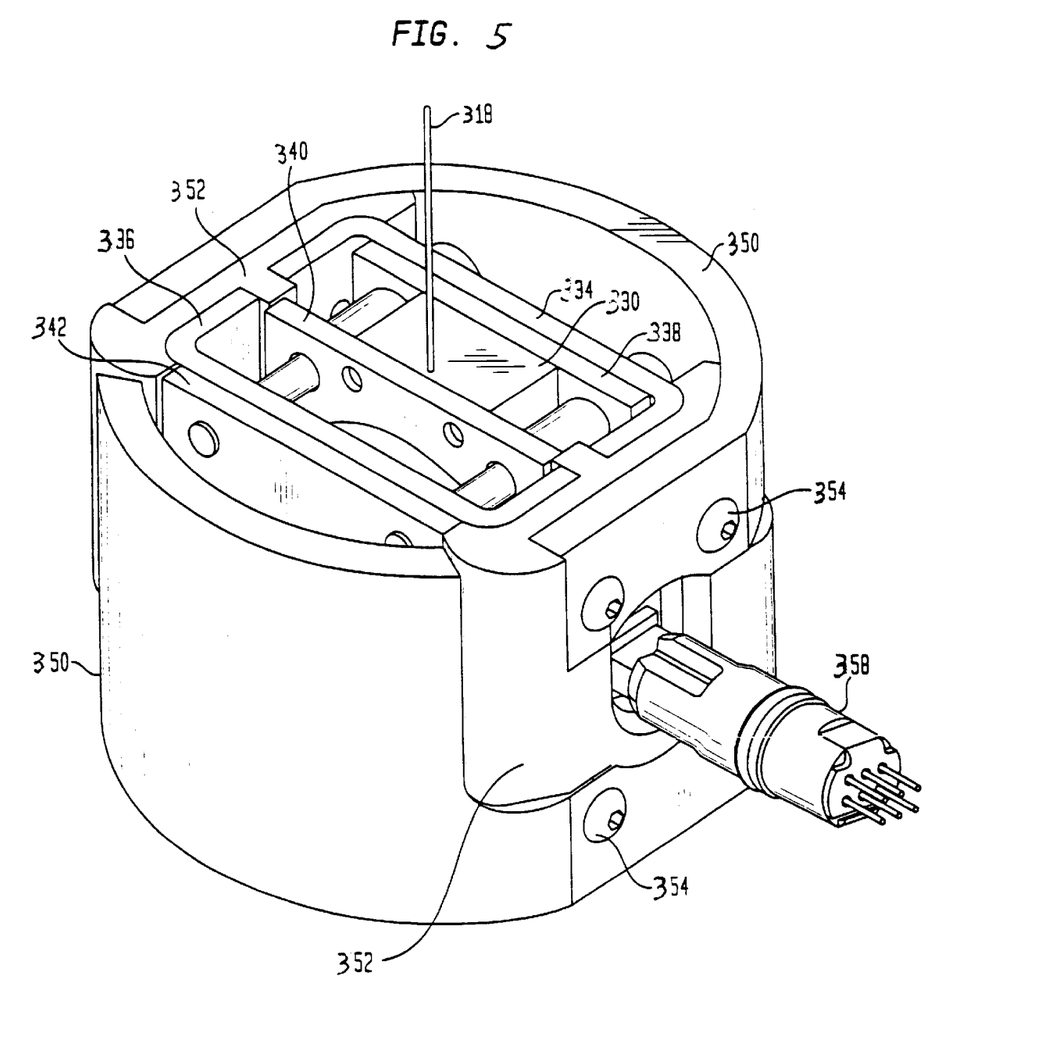
FIG. 5 shows an exemplary sensor according to the principles of the invention.

FIG. 5 shows a perspective view of an assembly with a high pressure seal assembly 358 that is used to connect the sensor 330 electrically to an external location so that the signals from the sensor 330 can be accessed by the electronic equipment exterior to the hydraulic cylinder. Accordingly, the high pressure seal assembly 358 is used to electrically interconnect between the internal location of the sensor 330 within the high pressure hydraulic fluid and the external environment where the information is gleaned from the signals of the sensor 330.

Figure 6A:
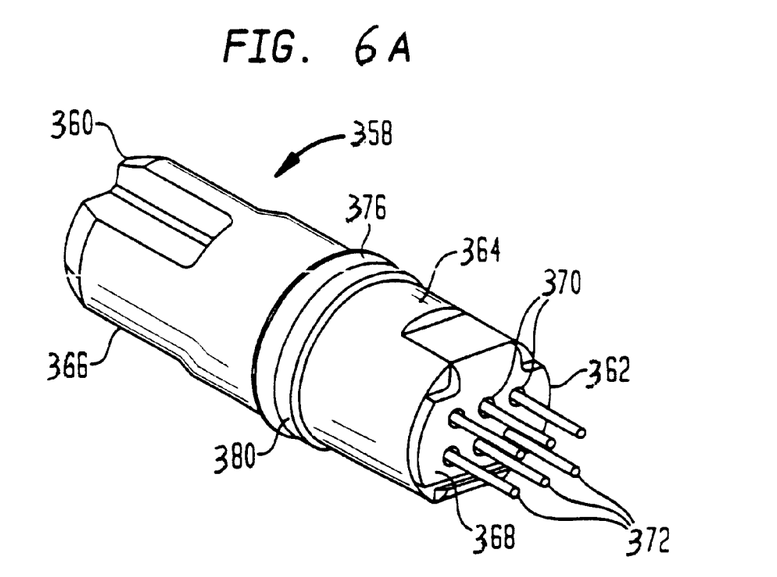
FIGS. 6A and 6B show an exemplary high-pressure seal assembly according to the principles of the invention.
Figure 6B:
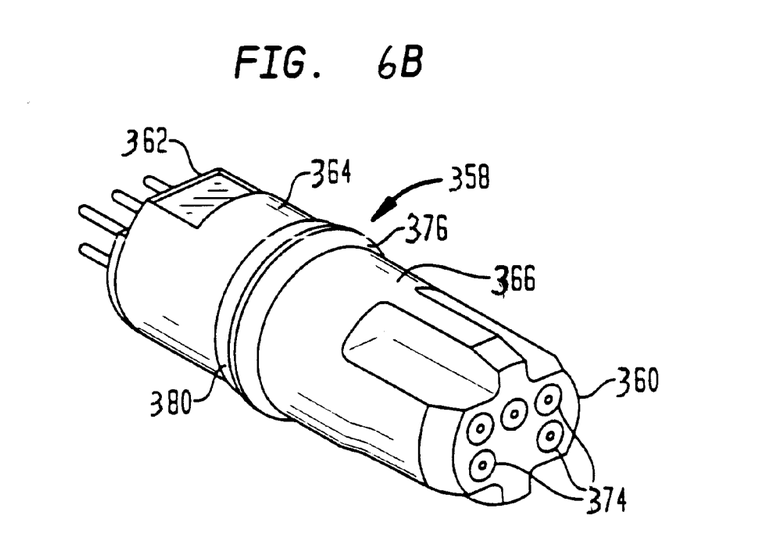

The construction and design of the high pressure seal assembly 358 is shown in FIGS. 6A and 6B and which are perspective views of the high pressure seal assembly 358 showing the internal end 360 in FIG. 6B and the external end 362 in FIG. 6A. The high pressure seal assembly 358 comprises a body 364 that may be constructed of a molded plastic material, a head 366 and an end cap 368. The end cap 368 has a plurality of aligned holes 370 through which protrude a plurality of conductive pins 372 that extend outwardly from the external end 362 and thereby forming a male connection to be available to be connected to a further female connector to transmit signals from the sensor 330 (FIG. 5) to an electronic circuit. As shown there are six conductive pins 372 that can be used, however, it may be preferred that a lesser or greater number of pins be utilized, such as five pins, so that any external plug to be affixed to the conductive pins 372 can only have one usable orientation in carrying out that connection to the high pressure seal assembly 358.

At the internal end 360 of the high pressure seal assembly 358, there is a corresponding number of female connectors 374 and which are adapted to be oriented so as to be connectable to the LVTD male connector plug 328 of FIG. 5. An O-ring 376 is located along the outer peripheral surface of the high pressure seal assembly 358 to assist in forming the high pressure seal as will be later explained and an anti-extrusion ring 378 is provided at the intersecting junction of the body 364 and the head 366 of the high pressure seal assembly 358.

Figure 7:
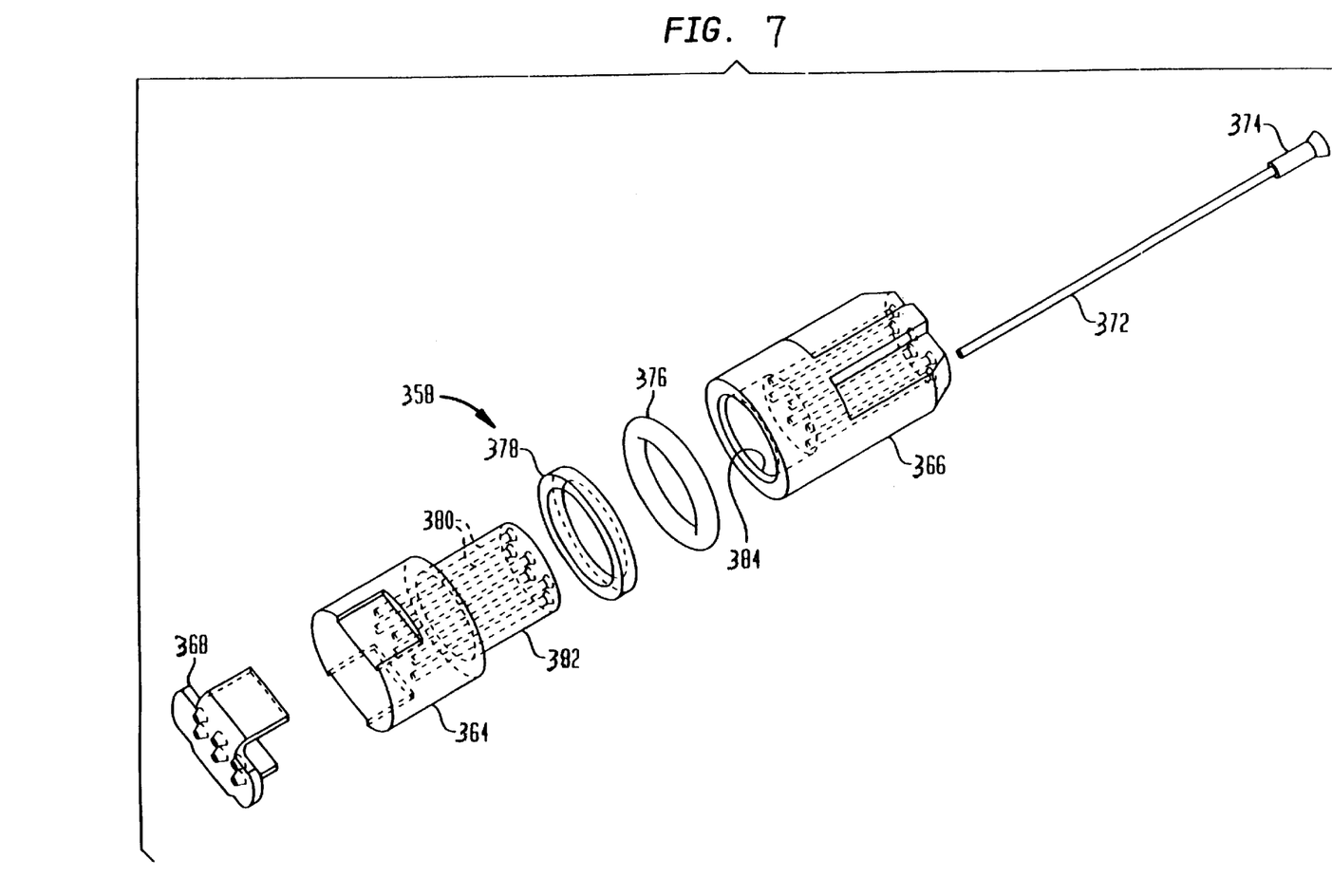
FIG. 7 shows an exemplary exploded view of the high pressure seal of FIGS. 6A and 6B according to the principles of the invention.

Turning now to FIG. 7, there is shown an exploded view of the high pressure seal assembly 358 of the present invention. Thus, the conductive pins 372 are preferably solid components that pass through both the head 366 and the body 364 to emerge and extend outwardly from the end cap 368. The female connectors 374 are affixed to the internal end of all of the conductive pins 372 as described. There are, of course cylindrical holes 380 formed in the body for passage of the conductive pins 372 therethrough and the body 364 also may include a reduced diameter end 382 that interfits into a suitably shaped opening 384 in the head 366 in an interference fit to solidly join those components firmly together. Intermediate the head 366 and the body 364, that is, at the junction thereof, there is provided the anti-extrusion ring 378 and the O-ring 376 to seal against the opening in the hydraulic cylinder when the high pressure seal assembly 358 is installed thereon.

As can therefore now be appreciated, with the high pressure seal assembly 358, there is a conductive path from the sensor contained within the high pressure environment of the hydraulic cylinder to the external environment outside of the hydraulic cylinder so that an external connector can pick up the signals and use those signals for the intended purpose of the present invention. Yet, the construction of the high pressure seal assembly 358 is relative easy to manufacture since the conductive pins 372 are solid and therefore the assembly does not have to deal with individual wires that normally require delicate handling. The conductive pins 372 are also inexpensive and are sealed into the thermoplastic material of the high pressure seal assembly 358 by ultrasonic swaging so that the plastic material actually melts around the conductive pins 372 or, as preferred, the conductive pins 372 are insert molded into the plastic material itself. An advantage of the present high pressure seal assembly 358 is that does not require any modifications to a commercial hydraulic cylinder.

Figure 8:
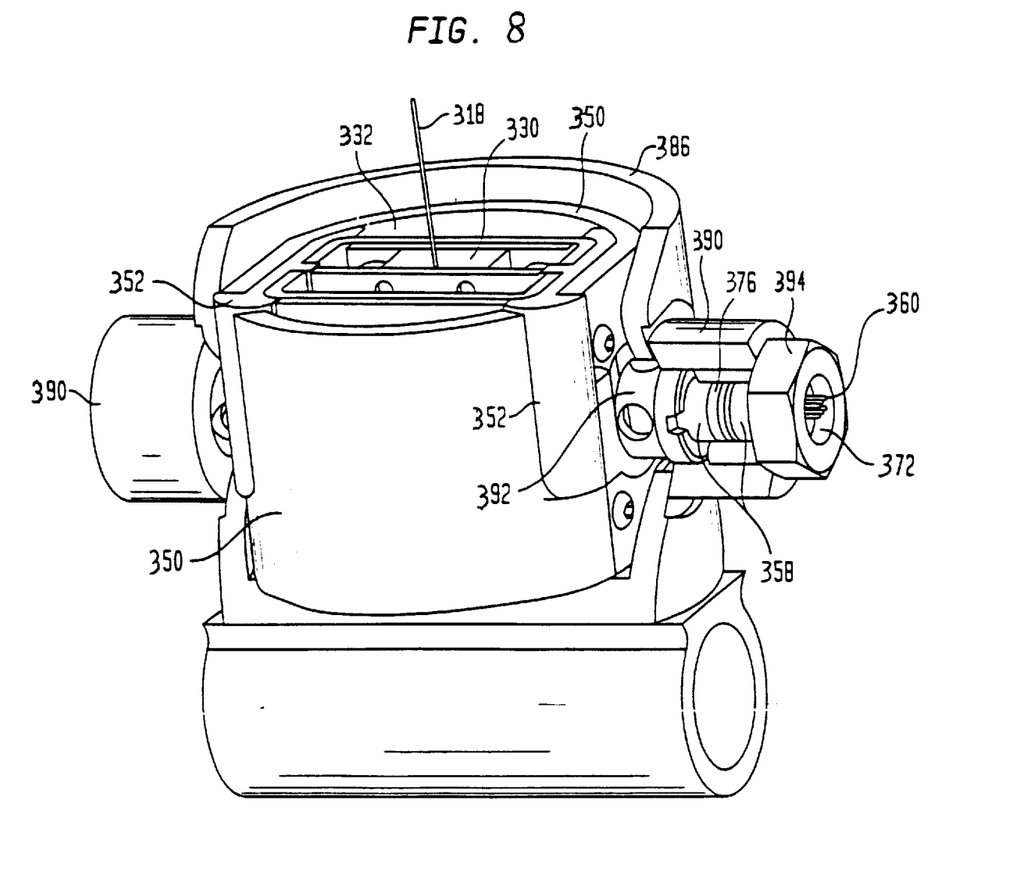
FIG. 8 shows an overall sensor contained with a hydraulic cylinder according to the principles of the invention.

In FIG. 8, there is shown a perspective view, partially cutaway, of the present invention installed in a hydraulic cylinder 386. Extending from the normal wall 388 of the hydraulic cylinder 386 is a hydraulic fluid port 390 through which the hydraulic fluid is supplied to the hydraulic cylinder 386 to cause the powered movement of the piston. There are, in the standard hydraulic cylinder 386 available today, normally two hydraulic fluid ports 390, oppositely disposed about the circular periphery of the hydraulic cylinder 386, that is, spaced about 180 degrees apart. As is normal, the hydraulic fluid may be introduced into the hydraulic cylinder 386 via either one of the hydraulic fluid ports, however, it is of importance herein that the hydraulic fluid ports 390 are basically standard on such hydraulic cylinders 386 and that the interior of such hydraulic fluid ports 390 are threaded so as to be connectable to the hoses supplying the hydraulic fluid, thus, the present invention can be readily accomplished without modifications to commercially available hydraulic cylinders including not only the holding of the sensor frame 332 in a firm position, but also to the various interconnections and wiring to have the signal from that sensor 330 reach the external ambient environment at the external end 360 of the high pressure seal assembly 358 with the conductive pins 372 forming an external male connection.

In FIG. 8, there is a threaded port insert 392 that is threaded into the hydraulic fluid port 390, the threaded port insert 392 having external threads that mate with the normal internal threads of the hydraulic fluid port 390 so that the port insert 392 can be simply screwed into the hydraulic fluid port 390. Although only one port insert 392 is shown in FIG. 8, there are actually two of the port inserts 392 used, the other being screwed into the oppositely situated hydraulic fluid port 390.

Since the port inserts 392 are hollow, one of the hydraulic fluid ports 390 can be used to locate and house a high pressure seal assembly 358 in order to provide an external connection ultimately to the sensor 330 within the interior of the hydraulic cylinder 386. Accordingly, as shown, the high pressure seal assembly 358 is inserted into a hydraulic fluid port 390 and is held therein by means of a retaining fitting 394 so that the high pressure seal assembly 358 is held within the hydraulic fluid port 390 and the O-ring 376 can seal against the internal surface of the hydraulic fluid port 390 to prevent leakage from the high pressure interior environment of the hydraulic cylinder 386.

It is to be understood that the invention is not limited to the illustrated and described forms of the invention contained herein. It will be apparent to those skilled it the art that various changes may be made without departing for the scope of the invention and the invention is not considered limited to what is shown in the drawings and described in the specification.

What is claimed is:

1. An electrical connector affixed in the housing wall of a hydraulic cylinder, said electrical connector comprising a unitary body of a thermoplastic molded material having an internal end located within the hydraulic cylinder and an external end located outside the hydraulic cylinder at atmospheric pressure, said body having a plurality of holes extending between the internal and the external ends, a plurality of electrical conductors sealingly affixed within the plurality of holes, the plurality of electrical conductors having oppositely disposed external connections.

2. The electrical connector as defined in claim 1 wherein one of the oppositely disposed electrical connections are female connections and the opposite end connections are male connections.

3. The electrical connector as defined in claim 2 wherein the female connections are located at the internal end of the body.

4. The electrical connector as defined in claim 2 wherein the male connections are located at the external end of the body and are configured to be connected to an industry standard electrical connector.

5. A method of manufacturing an electrical connector assembly comprising the steps of:

molding a body having an internal end and an external end, boring holes of a predetermined size through the body;

sealing electrical conductors within the holes bored into the body;

affixing the body to an hydraulic cylinder such that the internal end portion of the electrical conductors are disposed in a high pressure environment of the hydraulic cylinder.

6. The method of manufacturing as defined in claim 5 wherein the step of sealing the electrical conductors comprises ultrasonically welding the electrical conductors within the holes bored in the body.

7. The method of manufacturing as defined in claim 5 wherein the step of sealing the electrical conductors comprises swaging the electrical conductors to the body.

8. The method of manufacturing as defined in claim 5 wherein the step of sealing the electrical conductors comprises insert molding the electrical conductors within the body.

9. The method of manufacturing as defined in claim 6 wherein the step of providing electrical conductors comprises providing electrical conductors having oppositely disposed male connections and female connections.

10. The method of manufacturing as defined in claim 9 wherein the step of sealing the electrical conductors comprises sealing the electrical conductors such that the female connections are located at the internal end and the male connections are located at the external end of the body.

11. A hydraulic cylinder having a cylinder wall and a piston movable located within the cylinder wall, a position sensor located within the cylinder wall and adapted to sense the position of the piston and to produce signals indicative of the position of the piston, and an electrical connector electrically connected to the position sensor to pass the signals produced by the position sensor to a location external of the cylinder wall, the electrical connector being sealed within the cylinder wall and comprising a unitary body of a molded material having an internal end adapted to be located within the hydraulic cylinder and an external end adapted to be located external of the hydraulic cylinder, said body having a plurality of holes extending between the internal and the external ends, a plurality of electrical conductors sealingly affixed within the plurality of holes, each of the plurality of electrical conductors having oppositely disposed external connections, at least one of the oppositely disposed external connections configured to be affixed to an industry standard electrical connector.

12. The cylinder as defined in claim 11 wherein the electrical connector includes a sealing means to seal the electrical connector within the wall of the cylinder.

* * * * *